(12) United States Patent
Chen (10) Patent No.: US 9,781,334 B2
(45) Date of Patent: Oct. 3, 2017

(54) CONTROL METHOD, CAMERA DEVICE AND ELECTRONIC EQUIPMENT

(71) Applicants: Beijing Lenovo Software Ltd., Beijing (CN); Lenovo (Beijing) Co., Ltd., Beijing (CN)

(72) Inventor: Jiefeng Chen, Beijing (CN)

(73) Assignees: Beijing Lenovo Software Ltd., Beijing (CN); Lenovo (Beijing) Co., Ltd., Beijing (CN)

( * ) Notice: Subject to any disclaimer, the term of this patent is extended or adjusted under 35 U.S.C. 154(b) by 0 days.

(21) Appl. No.: 14/868,528

(22) Filed: Sep. 29, 2015

(65) Prior Publication Data

US 2016/0381286 A1 Dec. 29, 2016

(30) Foreign Application Priority Data

Jun. 24, 2015 (CN) .......................... 2015 1 0355784

(51) Int. Cl.
*H04N 5/232* (2006.01)
*G02B 27/64* (2006.01)

(52) U.S. Cl.
CPC ....... *H04N 5/23216* (2013.01); *G02B 27/646* (2013.01); *H04N 5/23212* (2013.01); *H04N 5/23238* (2013.01)

(58) Field of Classification Search
CPC .... G03B 37/00; H04N 5/232; H04N 5/23216; H04N 5/23238; H04N 5/23245; H04N 5/23248; H04N 5/23258; H04N 5/23251; H04N 5/23264; H04N 2013/0088
USPC ..... 396/133, 52, 53, 55; 348/36, 39, 208.99, 348/208.11, 208.12
See application file for complete search history.

(56) References Cited

U.S. PATENT DOCUMENTS

| 8,300,136 B2 | 10/2012 | Yamasaki |
| 2009/0322935 A1 | 12/2009 | Yamasaki |

(Continued)

FOREIGN PATENT DOCUMENTS

| CN | 201159720 Y | 12/2008 |
| CN | 101616257 A | 12/2009 |
| CN | 103048847 A | 4/2013 |

(Continued)

OTHER PUBLICATIONS

First Chinese Office Action regarding Application No. 201510355784.4 dated Aug. 14, 2017. English translation provided by Unitalen Attorneys at Law.

*Primary Examiner* — Rochelle-Ann J Blackman
(74) *Attorney, Agent, or Firm* — Harness, Dickey & Pierce, P.L.C.

(57) ABSTRACT

A control method, a camera device and an electronic equipment are provided in the disclosure. After acquiring a first control instruction, the lens of the camera device is controlled to perform a preset operation according to the first control instruction, until a preview image captured by the camera device meets a first preset requirement. The preset operation at least includes controlling the lens to form a first inclination angle with respect to an initial position of the lens. Thus the angle between a lens plane and an image plane is adjusted, i.e., the clarity at various parts of the image acquired by the camera device is adjusted, thus a target image desired by a user can be acquired by the camera device, thereby improving user experiences.

6 Claims, 5 Drawing Sheets

(56) References Cited

U.S. PATENT DOCUMENTS

2011/0141228 A1* 6/2011 Shimada .............. G03B 37/00
348/36
2016/0327806 A1* 11/2016 Kasamatsu .......... G02B 27/646

FOREIGN PATENT DOCUMENTS

| CN | 103246131 A | 8/2013 |
| CN | 104125395 A | 10/2014 |

* cited by examiner

Figure 9

CONTROL METHOD, CAMERA DEVICE AND ELECTRONIC EQUIPMENT

This application claims priority to Chinese Patent Application No. 201510355784.4, titled "CONTROL METHOD, CAMERA DEVICE AND ELECTRONIC EQUIPMENT", filed with the Chinese State Intellectual Property Office on Jun. 24, 2015, which is incorporated by reference in its entirety herein.

TECHNICAL FIELD

The disclosure relates to the application field of video capturing and photographing, and in particular to a control method, a camera device and an electronic equipment.

BACKGROUND

Nowadays, with the growing maturity of camera technology, more and more users choose to use a mobile phone for photo shooting or video capturing, due to simple operation and portability.

However, in the practice of photographing with a mobile phone, the applicants find that, existing mobile phones fail to adjust clarity in various parts of a captured image automatically or mechanically. Thus, when a user shoots an object at a certain distance through a mobile phone and the object is large, it is hard to take an image clear at various parts for the object. And when the user wants to highlight a specific position of the object, it is difficult to obtain an image clear at the specific location is and blurry at other positions, resulting in poor user experience.

SUMMARY

A control method, a camera device and an electronic equipment are provided, which facilitate adjusting and improving clarity at some parts of a captured image, and improving user experience.

Technical solutions as follows are provided.

A control method, applied to a camera device of an electronic equipment, includes:
acquiring a first control instruction;
controlling a lens of the camera device to perform a preset operation according to the first control instruction, until a preview image captured by the camera device meets a first preset requirement, where the preset operation at least includes controlling the lens to form a first inclination angle with respect to an initial position of the lens; and
controlling the camera device to capture a target image.

BRIEF DESCRIPTION OF THE DRAWINGS

In order for clarity of the technical solutions according to the embodiments of the disclosure, the drawings for the description of the embodiments are described briefly hereinafter. Apparently, the drawings described hereinafter are just embodiments of the disclosure, other drawings may be obtained by those skilled in the art according to those drawings without creative work.

FIG. 6(*a*) is a diagram of a light path in the camera device;

FIG. 6(*b*) is a diagram of a lens change implemented through the control method provided in the disclosure;

DETAILED DESCRIPTION OF THE EMBODIMENTS

The technical solution according to the embodiments of the disclosure will be described clearly and completely in conjunction with the drawings hereinafter. Apparently, the described embodiments are just a few rather than all of the embodiments of the disclosure. All other embodiments obtained by those skilled in the art based on the embodiments of the disclosure without any creative work will fall within the protection scope of the disclosure.

A control method, a camera device and an electronic equipment are provided in the disclosure. After acquiring a first control instruction, a drive component of the camera device is started based on the first control instruction, to control the lens of the camera device to perform a preset operation, until a preview image captured by the camera device meets a first preset requirement. The preset operation at least includes controlling the lens to form a first inclination angle with respect to an initial position of the lens, thus the angle between a lens plane and an image plane is adjusted, i.e., the clarity at various parts of the image acquired by the camera device is adjusted, thus a target image desired by a user can be acquired by the camera device, thereby improving user experiences.

For better understanding of the disclosure, the invention is described in detail with embodiments in conjunction with the drawings.

Figure 1:
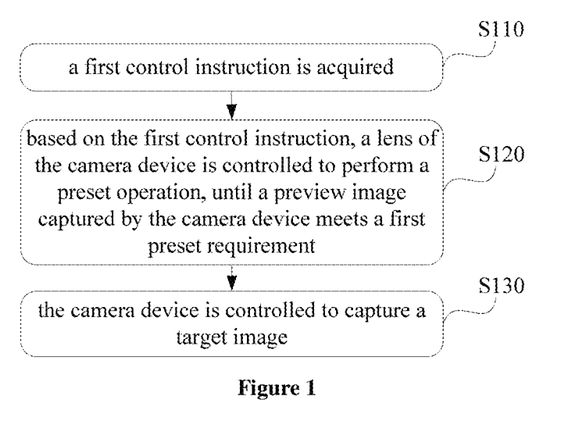
FIG. 1 is a flow chart of a control method according to an embodiment of the disclosure.

FIG. 1 is a flow chart of a control method according to an embodiment of the disclosure. The method may be applied to a camera device of an electronic equipment, where the electronic equipment may be a mobile phone but is not limited thereto. The control method according to the embodiment may include steps S110-S130.

In step S110, a first control instruction is acquired.

In practice, a mobile phone is taken as an example of the electronic equipment for illustration. When photographing through the mobile phone, the user usually chooses a shooting mode based on shooting requirement and shooting environment, such as panorama mode, bulb mode, macro mode, and automatic mode, so that the image displayed on a mobile phone display screen can meet a user requirement.

During photographing through the mobile phone, when the user operates on the mobile phone, e.g., choosing the shooting mode, the mobile phone obtains a corresponding control instruction based on the operation, in order to control the mobile phone to accomplish a corresponding operation, and meet the user requirement.

It may be seen that, the first control instruction may be a panoramic shooting instruction, a blurring control instruction, a night shot instruction, or an automatic shooting instruction, etc., which is not limited thereto.

In step S120, based on the first control instruction, a lens of the camera device is controlled to perform a preset operation, until a preview image captured by the camera device meets a first preset requirement.

The preset operation at least includes controlling the lens to form a first inclination angle with respect to an initial position of the lens, that is, the lens of the camera device may be controlled to rotate according to the first control instruction according to the embodiment, so that the lens forms the first inclination angle with respect to the initial position of the lens. It should be noted that, in practice, the initial position of lens of the camera device is usually a position in parallel to a photosensitive component, but is not limited thereto.

In addition, in the embodiment, the first preset requirement may be determined as desired by the user, and content of the first preset requirements corresponding to different control instructions are different. For example, in a case that the control instruction is a panoramic shooting instruction, the first preset requirement may be a requirement that all parts of the image displayed by the electronic equipment are clear; while in a case that the control instruction is a blurring control instruction, the first preset requirement may be a requirement that clarity of various parts of the image displayed by the electronic equipment meets a user's requirement, i.e., an object which is required to be clear by the user should be clear in the displayed image, an object which is required to be blurred should be blurred in the displayed image. That is, the image obtained by the electronic equipment can achieve a partially blurred effect as desired by the user.

In step S130, the camera device is controlled to capture a target image.

In summary, after obtaining the first control instruction, the lens of the camera device is controlled to perform the preset operation according to the first control instruction, until the preview image captured by the camera device meets the first preset requirement. The preset operation at least includes controlling the lens to form the first inclination angle with respect to an initial position of the lens, thus the angle between the lens plane and the image plane is adjusted, i.e., the clarity at various parts of the image acquired by the camera device is adjusted, thus the target image acquired by the camera device can meet the user requirement, which improves the user experience.

In practice, the user usually shoots some objects which the user wants to record through the electronic equipment when traveling or going out for a walk, and accordingly, the shooting mode of the electronic equipment is usually adjusted for better shooting effects in term of different shooting objects. For example, when shooting some small and refined objects, the user usually needs to shoot all parts clearly, and shallow depth of field shooting adopted in the macro mode cannot achieve the effect in this case; when shooting a scenery with a strong impact such as urban architecture, and a big scene with many people, a part distant from a focus point is usually blurred, which reduces the shooting effect.

Hence, to meet the user's requirement for panoramic shooting, the user usually needs to shoot the shooting object with various depth of field, to obtain a plurality of images with different depth of field. Then, superposition processing is performed on the images through image processing software (e.g., software of Photoshop CS5), and a new panoramic image is obtained. It is required that the user precisely shoots images with various depth of field, and is able to perform a large amount of processing on the images through the image processing software. But most users cannot reach this requirement, which indicates that most users cannot obtain a panoramic image in the above shooting condition; even if the user can obtain images with different depth of field, the processed image usually cannot meet the user's requirement for panoramic shooting due to low precision of the image processing software, which greatly reduces the user shooting experience.

Figure 2:
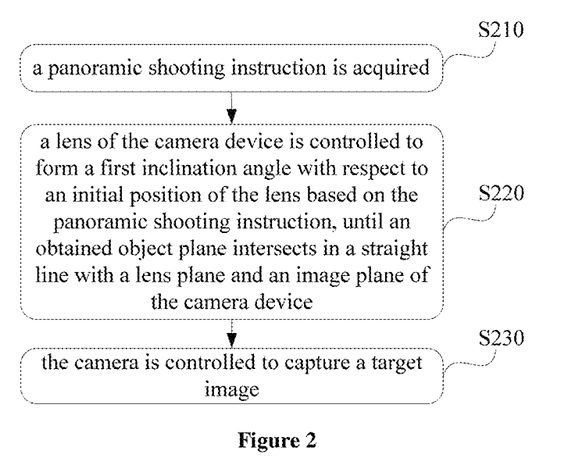
FIG. 2 is a flow chart of a control method according to another embodiment of the disclosure.

For improvement, another embodiment for the control method is provided in the disclosure, as shown in FIG. 2. The method may be applied to a camera device of an electronic equipment such as a camera of mobile phone. The method may include steps S210-S230.

In step S210, a panoramic shooting instruction is acquired.

Depth of field refers to a measured longitudinal range from the object where a clear image can be obtained by the camera of a mobile phone. After focusing, a clear image can be formed for objects within the longitudinal range from a focus point, and the front (direction towards the lens is front) and rear distance range may be called as depth of field. It may be seen that, the depth of field may be divided into front depth of field and rear depth of field, and panorama refers to that the whole image is solidly focused, i.e., the front and rear are both clear.

In practice, when panoramic shooting is required, the camera device of a mobile phone may be adjusted into the panorama mode, where the user can choose a shooting mode in the shooting interface of electronic equipment, for example via a click choosing mode or a voice choosing mode. The disclosure is not limited thereto, thus the panoramic shooting instruction may also be obtained based on a user operation according to an embodiment.

In step S220, a lens of the camera device is controlled to form a first inclination angle with respect to an initial position of the lens based on the panoramic shooting instruction, until an obtained object plane intersects in a straight line with a lens plane and an image plane of the camera device.

In this art, an aperture of the camera device of an electronic equipment, the focal length of the lens, and distance of the object, i.e., shooting distance, are all important factors affecting the depth of field. That is, the smaller the aperture is, the greater the depth of field is; the shorter the focal length is, the greater the depth of field is; the farther the shooting distance is, the greater the depth of field is. Thus, during the actual shooting process, the depth of field during image shooting may be adjusted by adjusting the aperture, focal length and shooting distance.

In practice, the user usually first adjusts the shooting angle of the camera device of electronic equipment, so that the image displayed in the display interface of mobile phone includes the subject which the user wants to shoot, and then adjusts parameters such as focal length and image distance, so that the clarity at various parts of the image displayed in the display interface can meet the user requirement.

Figure 3:
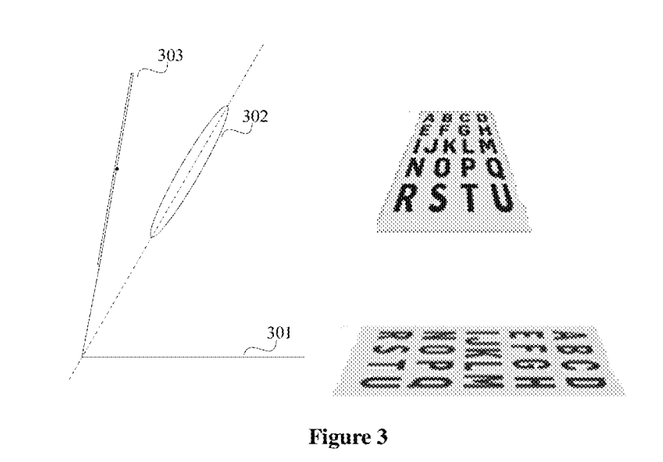
FIG. 3 is a structural diagram of a camera device in the control method according to another embodiment of the disclosure.

The applicant finds during research that, as shown in FIG. 3, in a case that the lens plane 302 where the lens locates, the image plane 303 where photosensitive components locate, and the object plane 301 where the object locates intersect in a straight line, the object is just in a focal plane. In this case, as long as focusing is well performed for one point of the object, other points in the object plane are also in the focal plane, thus the shot image is the clearest, i.e., the panoramic shooting is achieved.

The process of performing the focusing for one point of the object is a conventional technique, and particular focusing methods can refer to conventional focusing methods and are not repeated herein.

Optionally, in practice, the user first adjusts a shooting angle for the electronic equipment, and then focuses. Based on this, to implement the above step S220, the control method provided in the disclosure may further include:

in a case that a preview image captured by the camera device meets a second preset condition, obtaining a first angle of image plane of the camera device with respect to the object plane, and determining a first intersection line of the image plane and the object plane according to the first angle.

The second preset condition may refer to that the shooting object included in the current display image in the display interface of electronic equipment and the clarity of the shooting object can meet shooting requirements of the user. The disclosure is not limited thereto.

In practice, the photosensitive components and the camera device configuration are relatively fixed, thus, the distance and angle between the image plane and the object plane may be adjusted through adjusting the shooting angle of the camera device, until the obtained preview image meets the second preset condition. It should be noted that, a method for computing the distance and angle between the image plane and the object plane is a conventional technique in the field, which is not described in detail herein.

According to the above analysis, the above step S220 may include: controlling the lens of the camera device to form a first inclination angle with respect to an initial position of the lens, based on the panoramic shooting instruction, until an obtained lens plane overlaps the first intersection line.

Whether the current lens plane overlaps the first intersection line may be determined based on parameters such as the first inclination angle, image distance, focal length and/or object distance, i.e., whether the image plane, lens plane and object plane intersect in a straight line. The computing method is a conventional technique in the field, which is not described in detail herein. It should be noted that, the method for determining whether the image plane, lens plane and object plane intersect in a straight line is not limited to the above implementation method, and any method determined by those skilled in the art without any creative work falls within the protection scope of the disclosure.

In step S230, the camera is controlled to capture a target image.

It may be learned from the above analysis that, when it is determined that respective parts of the current displayed image in the display interface of the electronic equipment are clear, i.e., the current displayed image is the panoramic image, or it is determined that the image plane, lens plane and object plane intersect in a straight line, a shutter may be pressed to shoot the current displayed image as the target image.

Optionally, in practice, when determining whether the image plane, lens plane and object plane intersect in a straight line, first prompt information may be output, to prompt the user that the current displayed image of the electronic equipment is the panoramic image, and the shooting can be performed. It should be noted that, a prompting mode for the first prompt information is not limited, which may be indicator light flash prompt, beep, voice prompt, etc.

In conclusion, a specific inclination angle of the lens with respect to the initial position of the lens through adjusting the lens of camera device of the electronic equipment, so that the lens of camera device is no longer parallel to the photosensitive components. Then, a magnitude of the inclination angle is controlled, so that the image plane, lens plane and object plane of the camera device intersect in a straight line, and the panoramic image is obtained. The method is easy and convenient, and the user only needs to pay attention to the image displayed in the display interface of the electronic equipment, without shooting a plurality of images with different depth of field, or learning to process the plurality of images with different depth of field through image processing software to obtain a new panoramic image, which simplifies the steps for obtaining panoramic images and improves user experience.

In addition, during the shooting process, besides the requirement for obtaining the panoramic image, the user usually needs only one part of the whole shooting image to be clear and other parts to be blurred to highlight some features of the shooting object, and makes the shot image more beautiful.

To achieve the effects, the acquired image is partially blurred through image processing software usually. Similar to the above processing required for panoramic image, an image desired by a user can only be obtained by a user proficient in the image processing software, which is time-consuming, and the processing is complicated. In addition, limited to functions of the image processing software, it is difficult to clearly define an edge of the object in the processed image, so that the beautified image is unreal and cannot meet the blurring effect required by the user, which reduces user experience.

Figure 4:
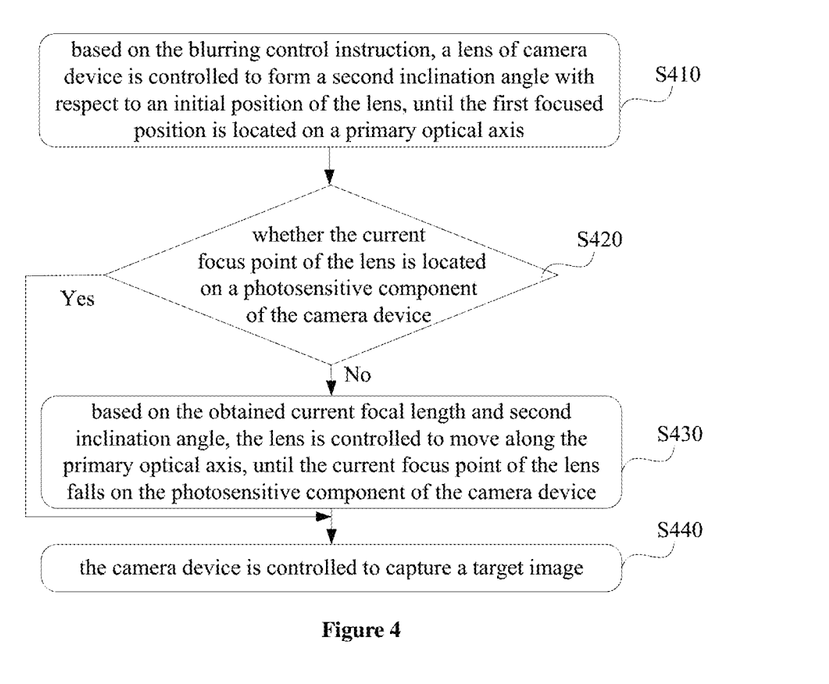
FIG. 4 is a partial flow chart of a control method according to still another embodiment of the disclosure.

For improvement, another embodiment of the control method is provided in the disclosure, that is, the control instruction obtained in the above step S110 is a blurring control instruction, and the blurring control instruction includes a first focused position acquired by a display device of the electronic equipment, as shown in FIG. 4. The control method may include steps S410-S440.

In step S410, based on the blurring control instruction, a lens of camera device is controlled to form a second inclination angle with respect to an initial position of the lens, until the first focused position is located on a primary optical axis.

Figure 5:
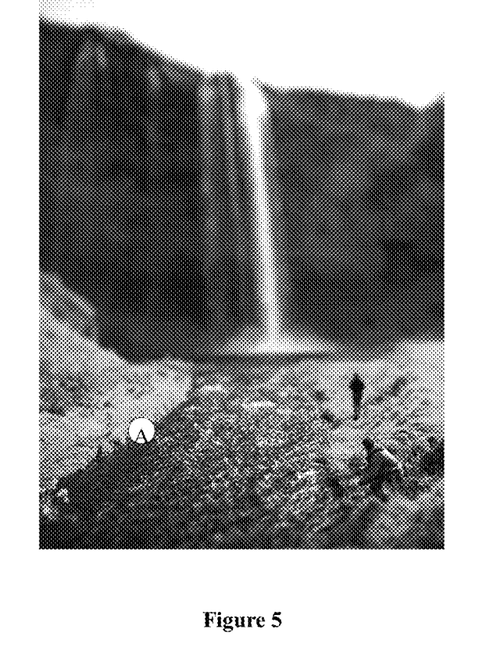
FIG. 5 is a diagram of an image obtained in another embodiment of the disclosure.

In an embodiment, after the user opens a shooting interface of mobile phone, and adjusts a shooting angle for the camera device of mobile phone, so that an image displayed in a current display interface of a mobile phone display screen includes an object to be shot by the user, the user usually chooses a part requiring clear presentation and the part requiring blurring in the display image based on display image features, aesthetic of the user, or preset shooting requirements. For a mobile phone with a touch screen, the user may directly click on a position (the first focused position) on the display screen as the part requiring clear presentation in this case, and the electronic equipment obtains the blurring control instruction based on a user operation. As shown in FIG. 5, region A in the figure may be the first focused position, but the disclosure is not limited thereto.

In addition, since the lens of camera device focuses on a specific point in practice, the point is focused into a clear image, hence, after the camera device of electronic equipment obtains the blurring control instruction, the lens is controlled to rotate (rotate along a direction with a specific inclination angle with respect to an initial position of the lens), in order to adjust the focus point position of the camera device, and the first focused position (position of the part requiring clear presentation in the whole preview image) chosen by the user coincides with an actual focus point position of the lens, thus a blurring effect required by the user is achieved.

It should be noted that, determining whether the first focused position chosen by the user is located on the primary optical axis of the lens is a conventional technique, which is not described in detail herein.

In step S420, it is determined whether the current focus point of the lens is located on a photosensitive component of the camera device, and if yes, the process proceeds to step S440; if no, the process proceeds to step S430.

In practice, after rotating the lens of camera device, relative positions of the lens and the photosensitive component changes, which probably makes the current focus point fall outside the photosensitive component and causes a failure in image capturing, thus, according to the embodiment, it is required to further determine whether the current focus point of the lens falls on the photosensitive component after determining that the first focused position chosen by the user is located on the primary optical axis of the lens.

Figure 6A:
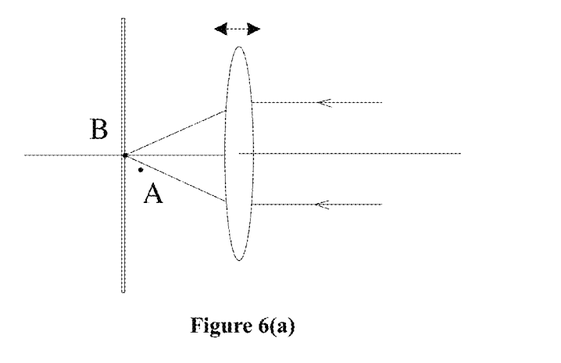
Figure 6B:
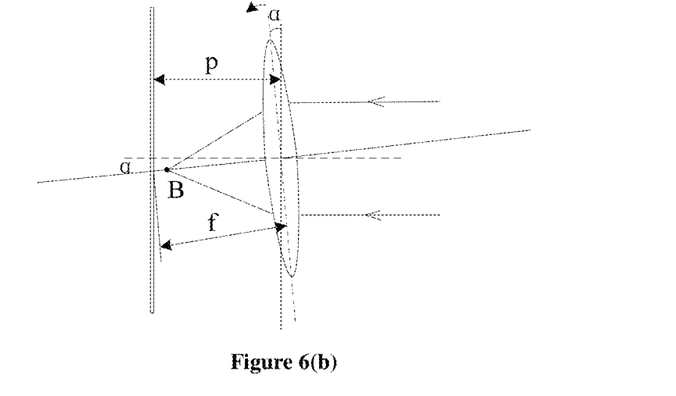

As shown in FIG. 6(a), at the initial position, the lens 601 parallels to the photosensitive component 602, and the focus point B locates at a middle position of the photosensitive component 602 in this case. After the lens rotates a second inclination angle α, as shown in FIG. 6(b), the current focus point B locates outside the photosensitive component, the camera device cannot perform the image shooting in this case, and it is required to further adjust the position of the current focus point. The specific adjusting process is as follows.

In step S430, based on the obtained current focal length and second inclination angle, the lens is controlled to move along the primary optical axis, until the current focus point of the lens falls on the photosensitive component of the camera device.

Optionally, referring to a diagram of a light path as shown in FIG. 6(b), in the process of adjusting the focus point of the lens, the obtained current focal length and the second inclination angle may be substituted into a first preset formula to calculate a target object distance, and then the lens is controlled to move along the primary optical axis according to the target object distance.

The first preset formula may be: $\cos(\alpha)=P/f$; where the cos is a cosine function; α is the second inclination angle; p is a first object distance; f is a first focal length.

It should be noted that, the method for adjusting the focus point is not limited thereto, and conventional methods for adjusting the focus point may also be adopted, of which the specific process is general knowledge in the field and is not described in detail herein.

In step S440, the camera device is controlled to capture a target image.

It may be learned from the above analysis that, the lens is rotated to locate the first focused position chosen by the user on the primary optical axis, and is controlled to move until the current focus point of the lens falls on the photosensitive component. Then, the camera device is controlled to shoot, and the target image is obtained. Thus the target image can meet a blurring requirement of the user, without processing the obtained target image through image processing software later, which greatly simplifies the steps of obtaining images with a chosen blurring effect, enlarges an applicable range, and improves user experience.

In conclusion, the lens of camera device is controlled to form the specific inclination angle with respect to the initial position of the lens, and a position relationship among the lens plane, the image plane and the object plane is adjusted, so that the lens plane no longer parallels to the image plane all the time, and the user can shoot a panoramic image and an image with clear and blurring positions chosen automatically though the electronic equipment directly, without learning to use image processing software to perform post-processing on the shot image, which is easy and convenient, and greatly improves the user experience. It should be noted that, the control method provided in the disclosure is not limited to implement the above panoramic shooting and the shooting with the specific blurring effect, the method may implement other shooting effects, all others determined based on the idea of controlling the lens to rotate by those skilled in the art without any creative work fall within the scope of protection of the disclosure.

Figure 7:
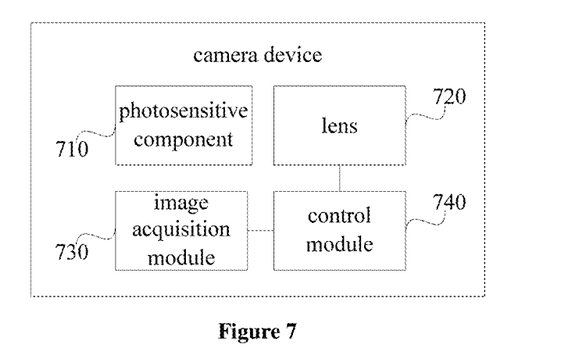
FIG. 7 is a structural diagram of a camera device according to an embodiment of the disclosure.

FIG. 7 is a structural diagram of a camera device according to an embodiment of the disclosure. The device may be applied to an electronic equipment, where the electronic equipment may be a mobile phone specifically and the camera device may be a camera of the mobile phone, but the disclosure is not limited thereto. The camera device provided according to the embodiment may include a photosensitive component 710, a lens 720, an image acquisition module 730 and a control module 740.

The photosensitive component 710 is an image sensor in the camera device, and is core of the camera device. In practice, the photosensitive component 710 may be a CCD (Charge Coupled Device, Charge Coupled Device), CMOS (Complementary Metal-Oxide Semiconductor, Complementary Metal-Oxide Semiconductor), etc., and the disclosure is not limited thereto.

It should be noted that, an imaging principle of the photosensitive component 710 is known in this art and is not described in detail herein.

The lens 720 is also an optical component in the camera device, and may include a plurality of lenses. A structure may refer to the lens structure in conventional camera devices, such as a lens structure in the camera of mobile phone, which is known in this art and is not described in detail herein.

The image acquisition module 730 is configured to capture an image of an object and obtain a preview image. A configuration may refer to an image acquisition module in conventional camera devices, which is not described in detail herein.

The control module 740 is configured to acquire a first control instruction, control the lens to perform a preset operation according to the first control instruction until the preview image meets a first preset requirement, and control the image acquisition module to capture a target image, where the preset operation at least includes controlling the lens to form a first inclination angle with respect to an initial position of the lens.

It may be seen that, the control module 740 has a control function recorded in the above method embodiment, and for the specific process for the control module 740 to implement rotation and movement control on the lens, so as to obtain a panoramic image and an image with a blurring effect chosen by the user, it may refer to the description of corresponding parts of the above method embodiments, which is not repeated in detail herein.

According to the above analysis, the lens 720 may rotate relative to the camera device. Thus, according to the embodiment, a stand for fixing the lens may rotate and move with respect to the camera device, and the specific structure is not limited thereto.

According to the above analysis, the lens is controlled to perform the preset operations, such as rotation and movement, so that the image plane of the camera device no longer parallels to the lens plane all the time, and the shot image can meet a user requirement, such as panoramic shooting and shooting with the blurring effect chosen automatically, without performing subsequent processing on the shot image, which is easy and practical, and greatly improves the user experience.

Figure 8:
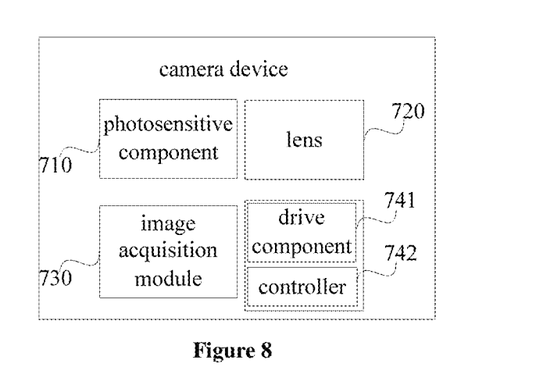
FIG. 8 is a structural diagram of a camera device according to another embodiment of the disclosure.

Optionally, as shown in FIG. 8, a control module 740 of a camera device provided in the disclosure may include a drive component 741 and a controller 742. After acquiring a first control instruction, the controller 742 may control the drive component 741 to make a lens perform a preset operation according to the first control instruction, i.e., control the lens to form a specific inclination angle with respect to an initial position of the lens, and to move along a primary optical axis of the lens when required, until the preview image meets a preset requirement. Then, the controller 742 controls the image acquisition module to capture a target image.

In practice, the drive component 741 may include an axial moving motor, configured to control the lens to rotate and move. In addition, a translational motor may be provided to control the lens to move, and the disclosure is not limited thereto.

In a case that the drive component 741 is the axial moving motor, to perform panoramic shooting, the axial moving motor may be started to control the lens to form an inclination angle with respect to an initial position of the lens after the control module 740 obtains a panoramic shooting instruction, until an obtained object plane intersects in a straight line with an image plane and a lens plane of the camera device, and then the image acquisition module is controlled to capture a target image, thus the panoramic shooting is achieved. It may be seen that, the panoramic image may be obtained directly through shooting with the camera device provided in the disclosure, without shooting, by the user, a plurality of images with various depth of field and processing the plurality of images with various depth of field through image processing software to obtain a new panoramic image, which is easy and convenient, and improves user experience.

In addition, in a case that the user needs to highlight features of a specific part of the shooting object and blur other parts, the drive component may include the axial moving motor and the translational motor. The axial moving motor controls the lens to rotate, and the translational motor controls the lens to move along the primary optical axis of the lens. After the user chooses a first focused position in a preview image displayed in a display screen of electronic equipment, and the control module 740 obtains a corresponding blurring control instruction, where the blurring control instruction may include the first focused position acquired by a display unit of electronic equipment, the axial moving motor is started based on the blurring control instruction to control the lens to form a second inclination angle with respect to an initial position of the lens, until the first focused position is located on a primary optical axis of the lens, and thus the first focused position is the current focus point. The process probably makes the current focus point fall outside the photosensitive component and causes a failure in imaging. To avoid the situation, it may be further determined whether the current focus point of the lens falls on the photosensitive component; if yes, the image acquisition module is controlled to acquire the target image; if no, the translational motor is started to control the lens to move along the primary optical axis based on the obtained current focal length and the second inclination angle, until the current focus point falls on the photosensitive component.

It may be seen that, the user is allowed to casually set blurring effect, and directly obtain an image meeting the blurring effect based on the setting, without processing the shot image through image processing software later, which is easy and convenient, enlarges an applicable range, and improves user experience.

Figure 9:
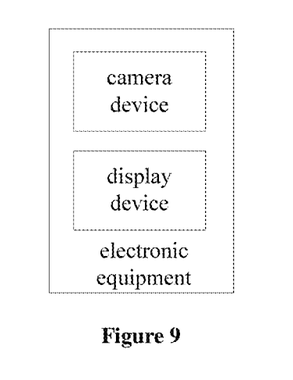
FIG. 9 is a structural diagram of an electronic equipment according to an embodiment of the disclosure.

FIG. 9 is a structural diagram of an electronic equipment according to an embodiment of the disclosure. The electronic equipment may include a camera device 910 and a display device 920.

A structure and functions of the camera device 910 are the same as the camera device recorded in the above embodiments, and description of corresponding parts of the above device embodiments may be referred to, which is not described herein.

The display device 920 may be configured to display a preview image acquired by the image acquisition module in the camera device 910.

The electronic equipment may be a mobile phone, the camera device may be a camera of the mobile phone, and the display device may be a display screen of the mobile phone. The disclosure is not limited thereto. It may be learned from the analysis that, the lens of camera device is controlled to form a specific inclination angle with respect to the initial position of the lens, and a position relationship among the lens plane, the image plane and the object plane is adjusted, so that the lens plane no longer parallels to the image plane all the time, and the user can shoot a panoramic image and an image with clear and blurring positions chosen automatically though the electronic equipment directly, without learning to use image processing software to perform post-processing on the shot image, which is easy and convenient, and greatly improves the user experience.

Finally, it should be noted that, in the disclosure, relational terms such as the first and the second are only configured to distinguish an operation from another operation, and it does not necessarily require or imply that there are such actual relationships or sequences among the operations. Furthermore, the term 'include', 'comprise' or any other variant thereof intends to cover a non-exclusive inclusion, thus allows a process, a method, or a system including a series of elements to include not only the elements, but also other elements not clearly set out, or to include intrinsic elements of the process, method, or system. Unless specifically restricted, elements defined by the statement 'include a . . . ' do not exclude the case that other similar elements exist in the process, method, or system including the elements.

The embodiments of the disclosure are described in a progressive manner, each embodiment focuses on the difference from other embodiments, and for the same or similar part, the embodiments may refer to each other. For the device and electronic equipment according to the embodiments, the device embodiments may correspond to the method embodiments, thus description is brief, and for relevance, the method part may be referred to.

The forgoing description of the embodiments of the disclosure, is to allow those skilled in the art to implement or use the disclosure. A variety of modifications to the embodiments are apparent for those skilled in the art, and the general principles defined in the disclosure may be implemented in other embodiments without departing from the spirit and scope of the invention. Hence, the disclosure is not limited to the embodiments shown in the disclosure, but conforms to a widest scope consistent with the principles and novel features in the disclosure.

What is claimed is:

1. A control method, applied to a camera device of an electronic equipment, wherein the method comprises:
   acquiring a first control instruction;
   controlling a lens of the camera device to perform a preset operation according to the first control instruction, until a preview image captured by the camera device meets a first preset requirement, wherein the preset operation at least comprises controlling the lens to form a first inclination angle with respect to an initial position of the lens; and
   controlling the camera device to capture a target image,
   wherein, in a case that the first control instruction is a panoramic shooting instruction, the controlling the lens of the camera device to perform the preset operation according to the first control instruction until the preview image captured by the camera device meets the first preset requirement comprises:
   controlling the lens of the camera device to form the first inclination angle with respect to the initial position of the lens, based on the panoramic shooting instruction, until an obtained object plane intersects in a straight line with an image plane and a lens plane of the camera device.

2. The method according to claim 1, further comprising:
   in a case that the preview image captured by the camera device meets a second preset condition, obtaining a first angle of image plane of the camera device with respect to the object plane;
   determining a first intersection line of the image plane and the object plane according to the first angle; and
   the controlling the lens of the camera device to form the first inclination angle with respect to the initial position of the lens, based on the panoramic shooting instruction, until the obtained object plane intersects in the straight line with the image plane and the lens plane of the camera device comprising:
   controlling the lens of the camera device to form the first inclination angle with respect to the initial position of the lens, based on the panoramic shooting instruction, until an obtained lens plane overlaps the first intersection line.

3. A camera device, applied to an electronic equipment, wherein the device comprises:
   a photosensitive component;
   a lens;
   an image acquisition module, configured to capturing an image of an object and obtain a preview image; and
   a control module, configured to acquire a first control instruction, control the lens to perform a preset operation according to the first control instruction until the preview image meets a first preset requirement, and control the image acquisition module to capture a target image,
   wherein the preset operation at least comprises controlling the lens to form a first inclination angle with respect to an initial position of the lens,
   wherein the control module comprises a drive component, configured to control the lens to perform the preset operation,
   in a case that the drive component is an axial moving motor, and the first control instruction is a panoramic shooting instruction, a control process performed by the control module comprises:
   starting the axial moving motor to control the lens to form the first inclination angle with respect to the initial position of the lens according to the obtained panoramic shooting instruction, until an obtained object plane intersects in a straight line with an image plane and a lens plane of the camera device, and controlling the image acquisition module to capture the target image.

4. A device according to claim 3, wherein, in a case that the preview image captured by the camera device meets a second preset condition, the control module is further configured to:
   obtain a first angle of image plane of the camera device with respect to the object plane;
   determine a first intersection line of the image plane and the object plane according to the first angle; and
   control the lens of the camera device to form the first inclination angle with respect to the initial position of the lens, based on the panoramic shooting instruction, until an obtained lens plane overlaps the first intersection line.

5. An electronic device, comprising:
   a camera device comprising:
     a photosensitive component;
     a lens;
     an image acquisition module, configured to capturing an image of an object and obtain a preview image; and
     a control module, configured to acquire a first control instruction, control the lens to perform a preset operation according to the first control instruction until the preview image meets a first preset requirement, and control the image acquisition module to capture a target image;
     wherein the preset operation at least comprises controlling the lens to form a first inclination angle with respect to an initial position of the lens; and
   a display device, configured to display the preview image acquired by the image acquisition module in the camera device,
   wherein the control module comprises a drive component, configured to control the lens to perform the preset operation,
   in a case that the drive component is an axial moving motor, and the first control instruction is a panoramic shooting instruction, a control process performed by the control module comprises:
   starting the axial moving motor to control the lens to form the first inclination angle with respect to the initial position of the lens according to the obtained panoramic shooting instruction, until an obtained object plane intersects in a straight line with an image plane and a lens plane of the camera device, and controlling the image acquisition module to capture the target image.

6. A device according to claim 5, wherein, in a case that the preview image captured by the camera device meets a second preset condition, the control module is further configured to:
   obtain a first angle of image plane of the camera device with respect to the object plane;
   determine a first intersection line of the image plane and the object plane according to the first angle; and
   control the lens of the camera device to form the first inclination angle with respect to the initial position of the lens, based on the panoramic shooting instruction, until an obtained lens plane overlaps the first intersection line.

* * * * *